(No Model.)

C. W. REED.
APPARATUS FOR FEEDING CALVES.

No. 274,379. Patented Mar. 20, 1883.

Witnesses:

Charles W. Reed
Inventor:

Attorney

UNITED STATES PATENT OFFICE.

CHARLES W. REED, OF NORTH PLATTE, NEBRASKA.

APPARATUS FOR FEEDING CALVES.

SPECIFICATION forming part of Letters Patent No. 274,379, dated March 20, 1883.

Application filed October 25, 1882. (No model.)

*To all whom it may concern:*

Be it known that I, CHARLES W. REED, a citizen of the United States of America, residing at North Platte, in the county of Lincoln and State of Nebraska, have invented certain new and useful Improvements in Apparatus for Feeding Calves; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to certain new and useful improvements in an apparatus for feeding calves and the young of live stock; and it consists in the construction and combination of the parts, as will be hereinafter more fully set forth and claimed.

Figure 1:
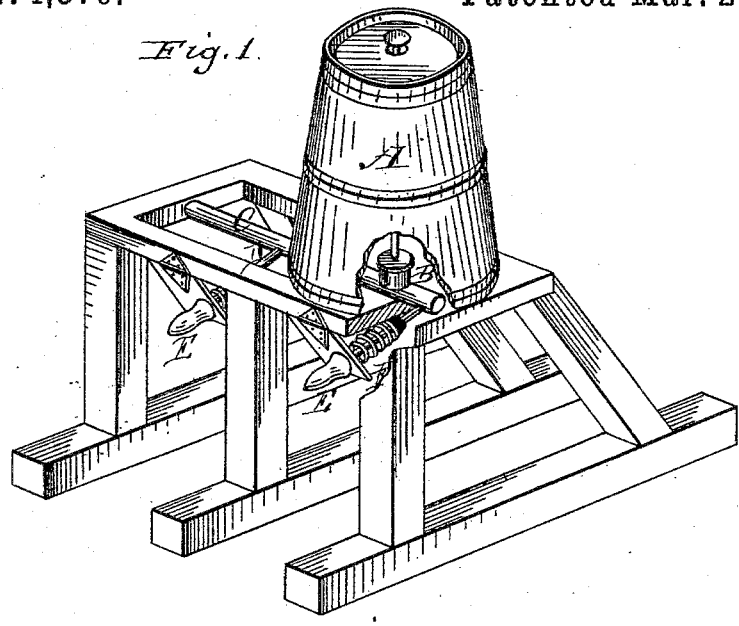
Figure 2:
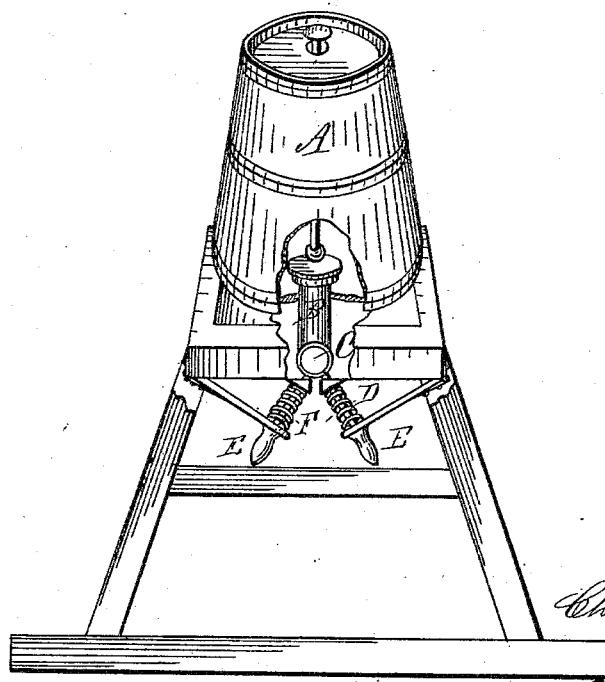

In the annexed drawings, in which Figure 1 is a perspective view of my device, and Fig. 2 a modification thereof, A represents the supply-tank, which is located above the stalls, and it is provided with a pipe which communicates with a longitudinal pipe located above the stall.

The pipe B, which is made of any pliable material, as rubber, is secured to the bottom of the tank A, and is provided with a valve for cutting off the supplies, which valve may be provided with a rod or other means for opening and closing the same, as desired. This valve has a seat on the upper end of the pipe B, as shown.

The pipe C, which extends over each of the stalls, has connected thereto a number of pliable pipes, D, which correspond in number with the stalls to which they lead. These pliable pipes or tubes D are attached to the hinged board, which is secured to the frame-work of the upper part of the stalls. These boards are also provided with rubber teats E, which have at their ends small openings or perforations. These pliable or rubber supply-pipes B are embraced by a spiral spring, F, the ends of which bear against the hinged board and pipe C. These hinged boards are held in an inclined position above each of the stalls by the pipe D, and they are movable upwardly when pressure is applied against them. If desirable, these boards to which the teats are attached may be covered and padded, so as to appear similar to a cow's udder, and they may be arranged on opposite sides of the longitudinal pipes C, as shown in Fig. 2. This arrangement is preferable when the stalls face each other. The teats, which are of rubber, will keep the perforations in the ends of the same closed, so that the milk or other liquid food will not flow from the same when the valve of the tank is opened and the teats are not in use. These perforations are of a sufficient size to allow the milk to be drawn through them when suction is applied by a calf.

This invention is used as follows: The tank or receptacle above the stalls being filled with milk or other liquid food, the valve being held open, the milk finding its way through the pipes to the teats. The calves, when they are feeding, as is well known, frequently throw their heads up and punch the udder of the cow, and when fed artificially they do the same thing.

Heretofore the teats have been secured to a rigid back, and the calves are liable to injure themselves, and, after hurting themselves several times, naturally reject the teat. I overcome this difficulty by providing a spring or movable back for the teat, so that they cannot injure themselves, as the back will give way and appear to the calves as a natural udder, and the calves, not being liable to injure themselves when they raise their heads to punch what they suppose is the udder, will take readily to the teat. It will also be noticed that I arrange the teats above the heads of the calves, which will approximate the natural position.

Having thus described my invention, what I claim as new, and desire to secure by Letters Patent, is—

1. In an apparatus for feeding young live stock, the combination of the teats E, attached in front of a hinged board, with a spring and supply pipe, substantially as shown and described.

2. In an apparatus for feeding calves, the stalls, having located above the same a supply tank and pipe, to which are attached pliable tubes provided with rubber teats and springs, in combination with the hinged board, substantially as described, and for the purpose set forth.

In testimony whereof I affix my signature in presence of two witnesses.

CHARLES W. REED.

Witnesses:
SAMUEL GOOZEL,
B. T. BLACKBURN.